US012645185B2

(12) United States Patent
Springer et al.

(10) Patent No.: US 12,645,185 B2
(45) Date of Patent: Jun. 2, 2026

(54) METHOD FOR MANUFACTURING A ONE-PIECE MECHANICAL TIMEPIECE PART

(71) Applicant: The Swatch Group Research and Development Ltd, Marin (CH)

(72) Inventors: Simon Springer, Berne (CH); Ahmad Odeh, Renens (CH)

(73) Assignee: The Swatch Group Research and Development Ltd, Marin (CH)

( * ) Notice: Subject to any disclaimer, the term of this patent is extended or adjusted under 35 U.S.C. 154(b) by 446 days.

(21) Appl. No.: 17/171,077

(22) Filed: Feb. 9, 2021

(65) Prior Publication Data

US 2021/0255588 A1 Aug. 19, 2021

(30) Foreign Application Priority Data

Feb. 17, 2020 (EP) .................................... 20157741

(51) Int. Cl.
*G04D 3/00* (2006.01)

(52) U.S. Cl.
CPC ........... *G04D 3/0069* (2013.01); *G04D 3/002* (2013.01)

(58) Field of Classification Search
CPC ............................. G04D 3/0069; G04D 3/002
See application file for complete search history.

(56) References Cited

U.S. PATENT DOCUMENTS

2007/0228012 A1 10/2007 Besson et al.
2008/0095968 A1 * 4/2008 Semon .................. B23K 26/40 219/121.72
2018/0341229 A1 11/2018 Oliveira et al.

FOREIGN PATENT DOCUMENTS

| | | | | |
|---|---|---|---|---|
| CH | 706101 | A2 * | 8/2013 | ............ G04C 3/146 |
| CH | 713 871 | A1 | 1/2019 | |
| CH | 714 594 | A1 | 7/2019 | |
| CH | 715 041 | A2 | 11/2019 | |
| CN | 101048256 | A | 10/2007 | |
| EP | 1 840 108 | A1 | 10/2007 | |
| EP | 2 889 703 | A2 | 7/2015 | |
| EP | 3 407 143 | A1 | 11/2018 | |
| JP | 8-10949 | A | 1/1996 | |
| JP | 2004-160618 | A | 6/2004 | |
| JP | 2005-283235 | A | 10/2005 | |

(Continued)

OTHER PUBLICATIONS

Machine Translation of CH-706101-A2 "Wheel position detection and synchronization device for clockwork mechanism of electronic needle watch, has light source and light detection system arranged so that light emitted by source is reflected by reflective strip towards system" by Born et al. (Year: 2013).*

(Continued)

*Primary Examiner* — Nirvana Deonauth

(74) *Attorney, Agent, or Firm* — Oblon, McClelland, Maier & Neustadt, L.L.P.

(57) ABSTRACT

A one-piece mechanical timepiece part formed by a gear for timepiece mechanisms, a wheel for timepiece mechanisms and/or a pinion for timepiece mechanisms, and its related method. The method for manufacturing the one-piece mechanical timepiece part by laser light includes the steps of providing a one-piece material part, oscillating and/or rotating the rotary element and forming the one-piece mechanical timepiece part by power and time modulation of the laser light.

11 Claims, 2 Drawing Sheets

(56) References Cited

FOREIGN PATENT DOCUMENTS

| | | | |
|---|---|---|---|
| JP | 2007-261266 | A | 10/2007 |
| JP | 2008-501534 | A | 1/2008 |
| JP | 2012-185128 | A | 9/2012 |
| JP | 2014-177711 | A | 9/2014 |
| JP | 2015-36656 | A | 2/2015 |
| WO | WO 2019/111195 | A1 | 6/2019 |
| WO | WO 2019/145434 | A1 | 8/2019 |

OTHER PUBLICATIONS

Combined Chinese Office Action and Search Report issued Mar. 2, 2022 in corresponding Chinese Patent Application No. 202110187464.8 (with Partial English Translation and English Translation of Category of Cited Documents), 9 pages.

Japanese Office Action issued Feb. 8, 2022 in Japanese Patent Application No. 2021-021485 (with English translation), 11 pages.

European Search Report issued Jul. 20, 2020 in European Application 20157741.8 filed Feb. 17, 2020 (with English Translation of Categories of Cited Documents), 3 pages.

Notice of the Reason for Refusal issued Sep. 20, 2022 in Japanese Patent Application No. 2021-021485 (with English language translation), 7 pages.

* cited by examiner

METHOD FOR MANUFACTURING A ONE-PIECE MECHANICAL TIMEPIECE PART

CROSS-REFERENCE TO RELATED APPLICATION

This application claims priority to European Patent Application No. 20157741.8 filed on Feb. 17, 2020, the entire disclosure of which is hereby incorporated herein by reference.

TECHNICAL FIELD

The field of the invention is that of manufacturing methods for timepiece parts.

TECHNICAL BACKGROUND

The machining of timepiece parts is carried out in a plurality of steps, such as the manufacture of the pinion and the axis of rotation in a first step, and the assembly of a wheel comprising the pinion and the axis in a second step.

This method has many limitations, such as that of alignment so that the pinion and the wheel mesh simultaneously, not to mention the orientation and flatness of the parts and their centring.

When small-sized parts are intended for a timepiece mechanism, the force exerted during the machining of these parts is sometimes unsuitable because it is too large and deforms them, thus limiting the accessible dimensions.

Furthermore, the assembly of the wheel on the axis of rotation exerts a certain force on the parts and can lead to the deformation of the wheel or of the axis.

Finally the fact that some parts must be machined separately and then assembled in order to form a system, imposes certain dimensions allowing assembly, for example, by driving, and for this reason may weaken their respective mechanical resistance.

SUMMARY OF THE INVENTION

The present invention proposes solving all or part of these disadvantages by means of a timepiece part manufactured according to a manufacturing method for a one-piece mechanical timepiece part by laser light; said manufacturing method comprising the steps of:

- providing a one-piece workpiece made of preferably crystalline, composite and/or amorphous material;
- transmitting a first power, geometry and time modulation of said laser light; and
- exposing at least a first portion of said at least one one-piece workpiece to said first modulation of said laser light so as to form at least a first volume;
- transmitting a second power, geometry and time modulation of said laser light; and
- exposing at least a second portion of said at least one one-piece workpiece to said second modulation of said laser light so as to form at least a second volume.

Through this provision, it is possible to manufacture one-piece mechanical timepiece parts without misalignment between the different pieces of the mechanical timepiece part or deformation of the latter, and allowing their dimensions to be maximised in order to increase their mechanical robustness, because there are no longer any assembly limitations. The example of an axis, the maximum diameter of which must allow driving of a pinion with the standard approach, is no longer limited using the proposed approach, allowing an axis of larger diameter which is in one piece with the pinion.

According to an embodiment, said manufacturing method comprises a step of rotating, during said at least one step of exposing at least one first portion of said at least one one-piece part and/or during said at least one step of exposing at least one second portion of said at least one one-piece part.

Through this provision, it is possible to manufacture symmetrical one-piece mechanical timepiece parts.

According to an embodiment, said manufacturing method comprises at least one step of forming at least one first relief, in particular at least one first convex relief or at least one first concave relief, and/or at least one step of forming at least one second relief, in particular at least one second convex relief or at least one second concave relief.

Through this provision, it is possible to manufacture one-piece mechanical timepiece parts with at least one relief.

According to an embodiment, the crystalline, composite or amorphous material is made of ceramic, quartz, glass, precious stone, metal, silicon, polymer, biological material and/or cermet.

According to an embodiment, said step of transmitting a first modulation and/or a second modulation, in power and in time, of the laser light is configured to produce an axis for timepiece mechanisms, a pivot for timepiece mechanisms, a rod for timepiece mechanisms, a pin for timepiece mechanisms, a gear for timepiece mechanisms, a wheel for timepiece mechanisms and/or a pinion for timepiece mechanisms or a combination of these mechanical timepiece parts, preferably an axis-pivot-pinion or axis-pinion-wheel.

Through this provision, it is possible to manufacture one-piece mechanical timepiece parts without misalignment between the different pieces of the mechanical timepiece part or deformation of the latter by ensuring the maximum dimensions for an improved robustness.

According to an embodiment, said step of power and time modulation of the laser light, is configured to smooth and/or polish a surface of said one-piece mechanical timepiece part.

Through this provision, the smoothing and/or polishing step can be carried out by the same method.

According to an embodiment, said first modulation and/or second modulation of the laser light, in power and time, is configured to satin and/or mattify a surface of said one-piece mechanical timepiece part.

Through this provision, it is possible to satin and/or mattify a surface of said one-piece mechanical timepiece part.

According to an embodiment, said manufacturing method comprises at least one structuring, colouring, marking, cutting, drilling, etching and/or ablation step.

Through this provision, it is possible to structure, mark, colour, cut, drill and/or etch.

The invention concerns the use of a laser light source in order to form at least a first relief, in particular at least a first convex relief or at least a first concave relief, at least one second relief, in particular at least one second convex relief or at least one second concave relief and/or for structuring, colouring, marking, cutting, drilling, edging and/or sculpting a one-piece mechanical timepiece part.

Through this provision, it is possible to manufacture one-piece mechanical timepiece parts without misalignment between the different pieces of the mechanical timepiece part or deformation of the latter by ensuring the maximum dimensions for an improved robustness.

CONCISE DESCRIPTION OF THE FIGURE

The invention will be described below in more detail using the attached drawings, given by way of example and in no way limiting, in which.

Figure 3A:
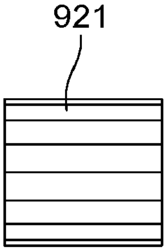
Figure 3B:
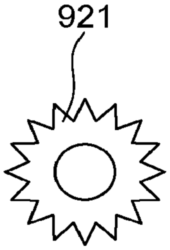
Figure 3C:
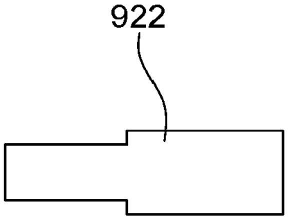
Figure 4A:
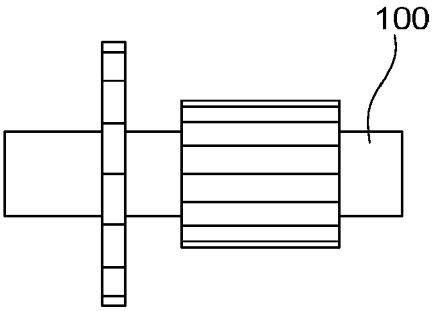
Figure 4B:
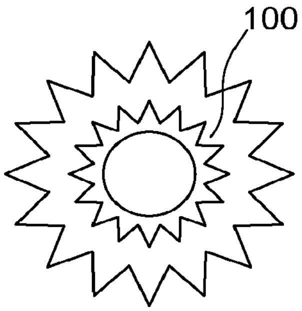

FIGS. 3A-3C show a pinion 921, viewed in profile and from the front, with an axis 922 comprising a shoulder; and, FIGS. 4A and 4B show a one-piece mechanical timepiece part 100, viewed in profile and from the front, produced by said manufacturing method according to the invention.

DETAILED DESCRIPTION OF THE INVENTION

The present invention concerns the use of a laser light source for forming a one-piece mechanical timepiece part comprising at least a first portion 530 with at least a first volume and at least a second portion 550 with a second volume.

Specifically, the timepiece part is manufactured according to the manufacturing method 500 by laser light, disclosed below.

In a first step, it is necessary to provide 510 a one-piece workpiece of crystalline, composite or amorphous material, which may be, depending on the part that it is desired to manufacture, made of ceramic, quartz, glass, precious stone, metal, silicon, polymer, biological materials such as wood, or mother-of-pearl to name but a few, and/or cermet.

Said one-piece mechanical timepiece part is placed in the path of the said laser light which transmits a first power, geometry and time modulation 520. Specifically, said laser light is modulated according to certain parameters such that on the exposure 530 of at least a first portion of said single-piece part, a first volume is formed. Furthermore, it is also possible to configure said first power and time modulation 520 of the laser light, so as to satin and/or to mattify a surface of said one-piece mechanical timepiece part, and this preferably at the end of the formation of the first volume.

Then, said one-piece mechanical timepiece part is placed in the path of the said laser light which transmits a second power, geometry and time modulation 540, preferably different from the first modulation 520. During the exposure of at least one second portion 550 of said one-piece workpiece to said second modulation 540, a second volume is formed. Furthermore, it is also possible to configure said second modulation 540, exactly as for said first power and time modulation 520, of the laser light, so as to satin and/or to mattify a surface of said one-piece mechanical timepiece part, and this preferably at the end of the formation of the second volume.

According to the embodiments, during said at least one exposure step of at least one first portion and/or during said at least one exposure step of at least one second portion, said at least one one-piece workpiece is rotated 560 in order to obtain symmetrical one-piece mechanical timepiece parts.

To this can be added a step 570 of structuring, colouring, marking, cutting, drilling, etching and/or ablation, which can be inserted at any time during said manufacturing method 500, for example during the transmission of the first power modulation (520) and/or of the second power modulation (540) of said laser light. One of the advantages of the structuring of a one-piece mechanical timepiece part is to allow an improved inertia of the part for example.

Hence the result or the product of this manufacturing method can be in the form of an axis for timepiece mechanisms, a pivot for timepiece mechanisms, a rod for timepiece mechanisms, a pin for timepiece mechanisms, a gear for timepiece mechanisms, a wheel for timepiece mechanisms and/or a pinion for timepiece mechanisms or a combination of these mechanical timepiece parts, such as preferably an axis-pivot-pinion or axis-pinion-wheel.

One of the advantages of this method is the manufacture of a one-piece mechanical timepiece part having a minimum difference in thickness and/or height between a pinion and an axis for example.

Furthermore, the one-piece mechanical timepiece parts, produced by said method of the invention, are manufactured without misalignment between the different pieces of the mechanical timepiece part or deformation of the latter, and allowing their dimensions to be maximised in order to increase their mechanical robustness, because there are no longer any assembly limitations. The example of an axis, the maximum diameter of which must allow driving of a pinion with the standard approach, is no longer limited using the proposed approach, allowing an axis of larger diameter which is in one piece with the pinion.

Indeed, on certain one-piece mechanical timepiece parts, current manufacturing methods require the machining of a pinion and an axis, then assembling of the pinion with the axis.

Figure 1:
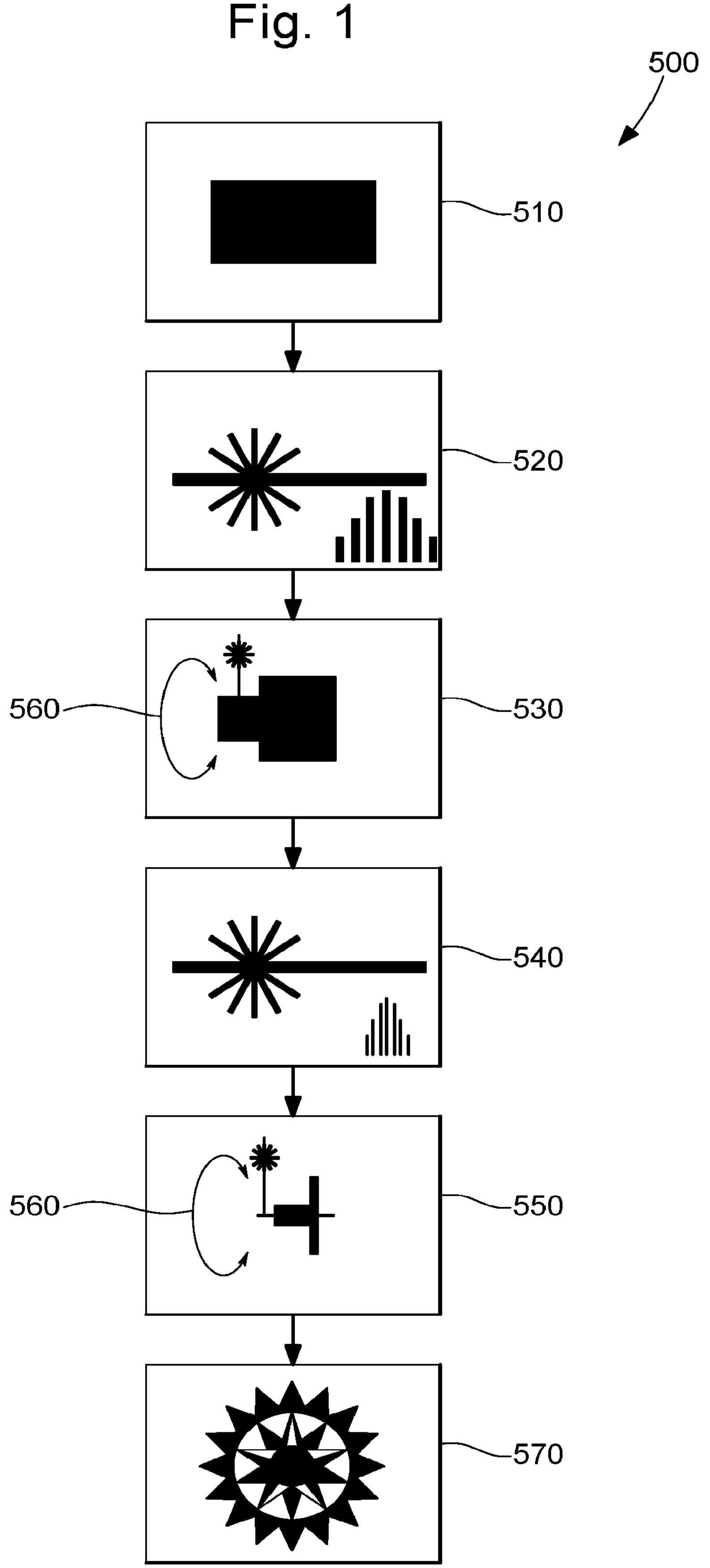
FIG. 1 shows a manufacturing method 500 for a one-piece mechanical timepiece part by laser light according to the invention.
Figure 2A:
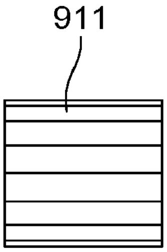
FIGS. 2A-2C illustrate a pinion 911, viewed in profile and from the front, for which the diameter of the hole for the axis 912 is close to the trough between two teeth.
Figure 2B:
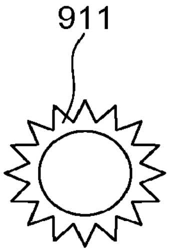
Figure 2C:
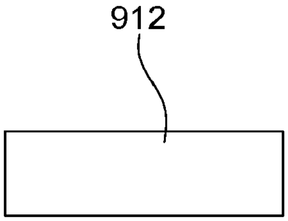

However, when the diameter of the hole of the pinion, see FIGS. 2A and 2B, which will serve for passage of the axis 912 represented in FIG. 2C, is close to the trough between two teeth, the machining operation is very delicate or even impossible without deforming either the toothing of the pinion 911 or the pinion 911 itself.

It is also possible to drill a hole in a pinion 921, see FIGS. 3A and 3B, further from the toothing. However, it is necessary to provide a shoulder on the axis 922, FIG. 2C, to allow the passage of said axis 922. A major disadvantage is misalignment because the more wheels or pinions there are on the axis, the more the alignment becomes complicated on the one hand and on the other hand, the axis 922 is weakened due to the difference in diameter which causes torsions on the axis not to mention the play which can appear at the wheel and/or the pinion.

By way of comparison, FIGS. 4A and 4B show a one-piece mechanical timepiece part 100 produced by said manufacturing method according to the invention that makes it possible to manufacture one-piece mechanical timepiece parts, with a wheel and pinion for example, without misalignment between the different pieces of the mechanical timepiece part or deformation of all or some of the latter, and with optimum dimensions allowing a reduced bulk but an improved mechanical robustness.

The invention claimed is:

1. A method for manufacturing a unitary one-piece mechanical timepiece part from a one-piece workpiece by laser light, the timepiece part including a pinion, said manufacturing method comprising:

providing the one-piece workpiece;

transmitting a first power, geometry and time modulation of said laser light;

exposing at least a first portion of the one-piece workpiece to a first modulation of said laser light so as to form at least a first volume of the timepiece part, the first volume including a first part corresponding to a first wheel and a second part corresponding to the pinion;

transmitting a second power, geometry and time modulation of said laser light; and exposing at least a second portion of the one-piece workpiece which has been exposed to form the first volume to a second modulation of said laser light so as to form at least a second volume of the timepiece part, the second volume unitary with the first volume and including a second wheel, wherein the pinion, first wheel and second wheel are formed as the unitary one-piece mechanical timepiece part from the one-piece workpiece.

2. The manufacturing method according to claim 1, which comprises a step of rotating, during said at least one step of exposing at least a first portion of the one-piece workpiece and/or during said at least one step of exposing at least a second portion of the one-piece workpiece.

3. The manufacturing method according to claim 1, which comprises at least one step of forming at least one first relief, and/or at least one step of forming at least one second relief.

4. The manufacturing method according to claim 1, wherein the one-piece workpiece is made of crystalline, composite and/or amorphous material.

5. The manufacturing method according to claim 1, wherein said step of transmitting a first modulation and/or a second modulation, in power and in time, of the laser light is configured to produce an axis for timepiece mechanisms, a pivot for timepiece mechanisms, a rod for timepiece mechanisms, a pin for timepiece mechanisms, a gear for timepiece mechanisms, a wheel for timepiece mechanisms and/or a pinion for timepiece mechanisms or a combination of these mechanical timepiece parts.

6. The manufacturing method according to claim 1, wherein said first modulation and/or second modulation, in power and time, of the laser light is configured to smooth and/or polish a surface of said one-piece mechanical timepiece part.

7. The manufacturing method according to claim 1, wherein said first modulation and/or second modulation, in power and time, of the laser light is configured to satin and/or mattify a surface of said one-piece mechanical timepiece part.

8. The manufacturing method according to claim 1, which comprises at least one structuring, colouring, marking, cutting, drilling, etching and/or ablation step.

9. The manufacturing method according to claim 4, wherein the crystalline, composite or amorphous material is made of ceramic, quartz, glass, precious stone, metal, silicon, polymer, biological material and/or cermet.

10. The manufacturing method according to claim 3, wherein the at least one first relief is at least one first convex relief or at least one first concave relief.

11. The manufacturing method according to claim 3, wherein the at least one second relief is at least one second convex relief or at least one second concave relief.

* * * * *